(No Model.)  2 Sheets—Sheet 1.

H. W. ROBERTS.
SAW GUIDE.

No. 333,339.  Patented Dec. 29, 1885.

Witnesses
Wm. J. Planner,
Edward L. Mills.

Inventor
HENRY W. ROBERTS
per [signature]
Attorney

N. PETERS, Photo-Lithographer, Washington, D. C.

(No Model.) 2 Sheets—Sheet 2.

H. W. ROBERTS.
SAW GUIDE.

No. 333,339. Patented Dec. 29, 1885.

Witnesses
Wm. J. Danner
Edward L. Mills

Inventor
HENRY W. ROBERTS
per [signature]
Attorney

UNITED STATES PATENT OFFICE.

HENRY W. ROBERTS, OF DUNCAN CITY, MICHIGAN.

SAW-GUIDE.

SPECIFICATION forming part of Letters Patent No. 333,339, dated December 29, 1885.

Application filed September 26, 1885. Serial No. 178,219. (No model.)

*To all whom it may concern:*

Be it known that I, HENRY W. ROBERTS, a citizen of the United States, residing at Duncan City, in the county of Cheboygan and State of Michigan, have invented certain new and useful Improvements in Saw-Guides, of which the following is a specification, reference being had therein to the accompanying drawings.

This invention relates to guides for circular and other saws; and the novelty consists in the construction, arrangement, and adaptation of parts, as will be more fully hereinafter set forth, and specifically pointed out in the claims. In sawing to a line, while a slight deviation upon the "waste" side of said line might not be of material importance, it is desirable to so guide the saw with relation to the line that no infraction whatever shall occur on the "work" side thereof. For other reasons it is desirable to guide the blade of the saw in its relation to the work, and various devices have been designed for this purpose. I provide a guide with two jaws, either of which may be adjusted in opposite directions at will without in any way interfering with the operation of the saw. One of these jaws operates upon either side of the saw, and each jaw is provided with a leather or similar bearing, which will hold a lubricant and give a minimum of friction while in contact.

The body of my improved guide which supports the adjustable jaws is of itself adjustable with relation to a stationary base and the axis of the saw, and may be readily placed nearer to or farther from said axis to quickly accommodate saws of various sizes. This feature is important not only in the fact that it allows the operator to readily adjust the guides with relation to saws of different sizes, but it allows an "evening" file, secured to the inner surface of the curve guide-arm, to be forced with nicety against the ends of the teeth while the saw is in motion, to keep the saw in a perfect circle.

This invention is illustrated in the accompanying drawings, which form a part of this specification, and in which—

Figure 1:
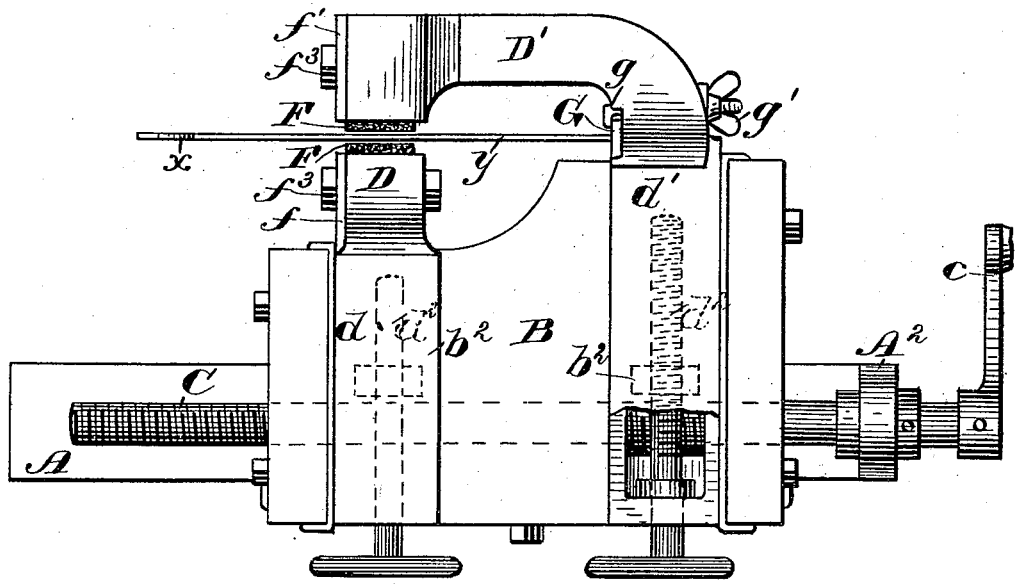
Figure 2:
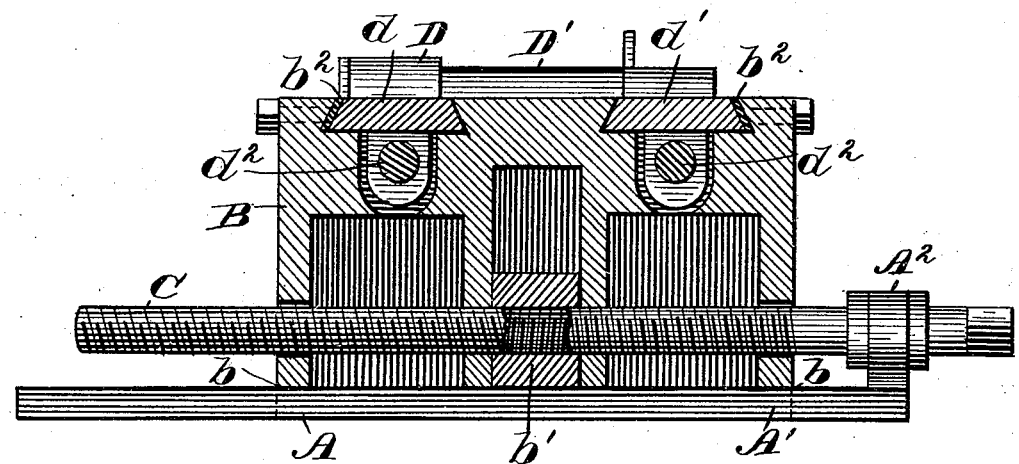
Figure 3:
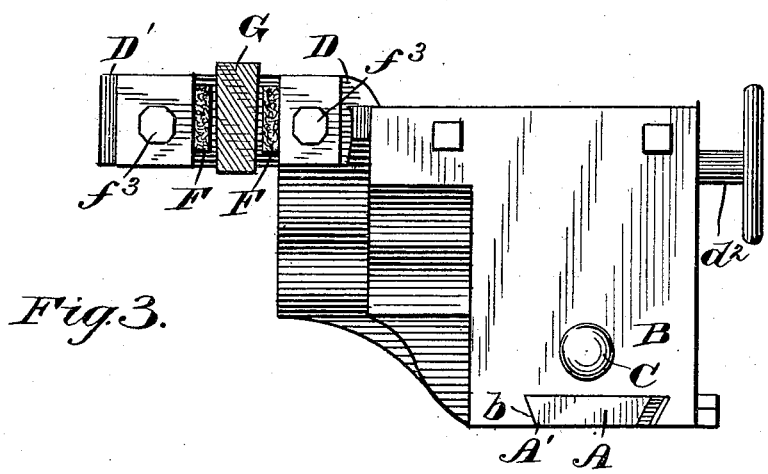
Figure 4:
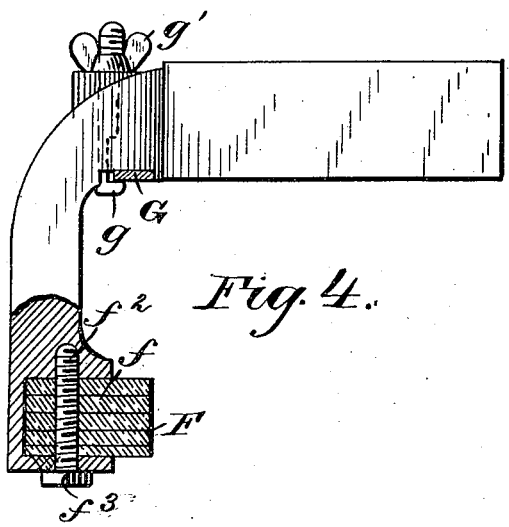

Figure 1 is a top plan view with interior parts shown in dotted lines. Fig. 2 is a side elevation, broken away to show the screw-shaft. Fig. 3 is an end view, and Fig. 4 a detail view of one of the jaws.

Referring to the drawings, A designates a base, which is adapted to be stationarily secured to any part of a saw-frame, and it has a dovetail guide, A', which is received in the corresponding groove, $b$, of the body B. A threaded shaft, C, operating through a standard, $A^2$, of the base, serves in a threaded socket, $b'$, in the body B, to allow said body to be readily adjusted in either of two directions, a crank, $c$, serving as a convenient means for rotating said shaft. The body B has two parallel dovetail grooves, $b^2$, which receive the shanks $d$ and $d'$, respectively, of the short jaw D and the curved jaw D', threaded bolts at $d^2$ serving in sockets in each shank to allow the jaws to be adjusted in either of two directions at will. The shanks $d$ and $d'$ move in directions at right angles to the plane of movement of the body B which supports them, the latter moving to and from the axis of the saw, and the jaws D and D' moving in directions parallel with said axis to allow the bearings of the jaws to be projected against the side of the saw-blade. The axis of the saw is designated by the letter $x$ and the saw by the letter $y$. Each jaw is formed with an open-faced socket, $f$, which receives plates of leather or other soft absorbent material, which comprise bearings F, the said material being held in place by a plate, $f'$, a bolt, $f^2$, and a nut, $f^3$. It is important that these bearings be well lubricated, soft, and capable of engendering but little friction, as the rapid movement of the saw would otherwise generate a heat which would be troublesome if not disastrous. The bearings described will absorb oil, and are otherwise calculated to induce but a minimum friction with no material heating.

In the inner curve of the long arm of the jaw D', I secure removably a file, G, the same being held in front of the saw-teeth by a hook-bolt, $g$, and a thumb-nut, $g'$. By proper manipulation of the shaft C this file may be brought slowly and with a great nicety of motion to bear against the saw-teeth while the saw is in motion to preserve the saw in a true circle.

The operation of the device will be obvious to those skilled in the art to which it relates.

Modifications in details of construction may be made within wide limits without departing from the principle or sacrificing the advantages of the invention, the essential features of which will be readily understood.

What I claim as new is—

1. In a saw-guide for circular saws, the combination of a movable body, as B, independently-adjustable jaws, as D D', adapted to bear at will on either side of the saw and carrying anti-friction bearings, as F, and a screw-threaded shaft, as C, having suitable bearings whereby the body B, supporting the jaws D D', may be moved at right angles to the axis of the saw, substantially as described.

2. In a saw-guide for circular saws, the combination of the movable body B, independently-adjustable jaws D D', having anti-friction bearings, as F, a removable file, as G, situate in the curve of the arm of jaw D', for keeping the saw at a true circle, and the screw-threaded shaft C, having crank c, for adjusting the jaws D D' to and from the axis of the saw at will, to accommodate saws of different sizes, substantially as described.

3. In a saw-guide for circular saws, the combination of a base, as A, having a dovetail guide, as A', a movable body, B, having a groove to receive guide A', independently-adjustable jaws D D', having sockets $f$, to receive anti-friction bearings F, and means, as $f'$, $f^2$, and $f^3$, for removably securing the same, a file, as G, situate in the curve of the arm of the jaw D', for the purpose stated, and a screw-threaded shaft, C, having a crank, c, for moving the body B at right angles to the axis of the saw, so as to adjust the jaws D D' to saws of different sizes, substantially as described.

In testimony whereof I affix my signature in presence of two witnesses.

HENRY W. ROBERTS.

Witnesses:
WATTS S. HUMPHREY,
J. P. SUTTON.